United States Patent [19]

Jefferson

[11] Patent Number: 4,520,749

[45] Date of Patent: Jun. 4, 1985

[54] CHECKLIST DEVICE

[76] Inventor: David A. Jefferson, 353 New Shackle Island Rd., Hendersonville, Tenn. 37075

[21] Appl. No.: 492,342

[22] Filed: May 6, 1983

[51] Int. Cl.³ .............................................. G09F 9/00
[52] U.S. Cl. ..................................... 116/325; 116/324
[58] Field of Search ....................... 116/325, 324, 308; 40/490, 491; 206/44 B, 459, 484

[56] References Cited

U.S. PATENT DOCUMENTS 2,596,374  5/1952  Crapster ............................... 116/308
2,853,045  9/1958  Thomas ................................ 116/324
3,195,813  7/1965  Hart .................................... 116/325
3,780,695  12/1973  Richard .............................. 116/325

Primary Examiner—Charles Frankfort
Assistant Examiner—Denis E. Corr
Attorney, Agent, or Firm—John J. Byrne; Bradford E. Kile; Kevin M. O'Brien

[57] ABSTRACT

A device that contains a pocket wherein checklist cards can be inserted that match with pushbuttons that are used to indicate completion of certain steps in a series of steps.

3 Claims, 6 Drawing Figures

CHECKLIST DEVICE

BACKGROUND OF INVENTION

In many endeavors, there are checklists of steps or tasks that must be completed prior to commencing safely with a future operation. For instance, checklists, as a safety measure, must be completed prior to operating an airplane or operating complicated and/or expensive machinery.

SUMMARY OF THE INVENTION

This invention provides a device that can receive a plurality of checklist cards. The device can be operated by one hand so that the operator's other hand is free to perform other functions. The invention utilizes snap-type press buttons that indicate completion of each step as it is performed. If the user is interrupted in any way during the checklist procedure, he can readily determine the last step in the series that had been performed.

OBJECTIVES OF THE INVENTION

A primary objective of this invention is to provide a device systematically informing a person who is performing a checklist with information as to which tasks have been completed.

Another objective of the invention is to provide a device of this type which can be readily operated by one hand while the other hand is free to perform other tasks.

A further objective of the invention is to provide a device that can be adapted to receive more than one checklist.

Another objective of this invention is to provide a snap-press button to show completion of each step in the checklist procedure.

Other objectives and advantages of the present invention will become apparent from the appended detailed description of the preferred embodiment taken in conjunction with the accompanying drawings in which:

DETAILED DESCRIPTION OF THE DRAWINGS

Figure 1:
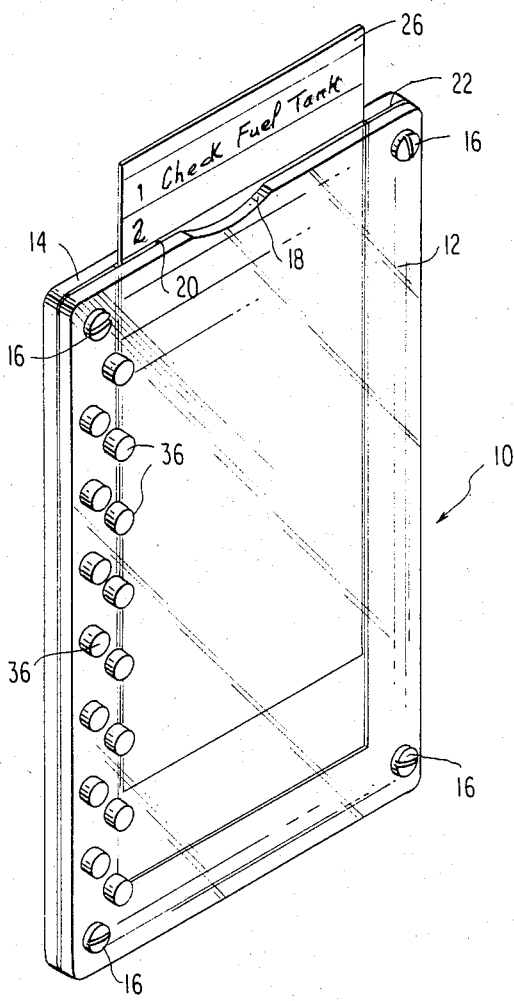
FIG. 1 is a perspective view of the device.
Figure 3:
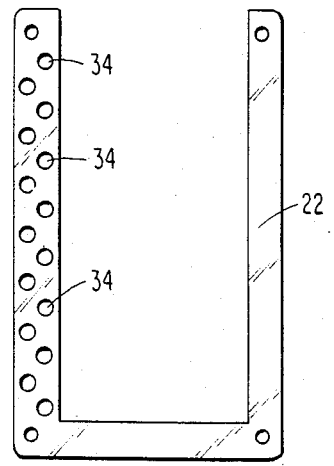
FIG. 3 is a plan view of a shim member.

Referring now to the drawings wherein like numerals indicate like parts, the device is shown generally by the numeral 10. In the embodiment shown in FIG. 1, the device is comprised of a front lucite panel or member 12 and a rear lucite panel or member 14 which members are secured in a face-to-face parallel relationship by way of fasteners 16. At their upper edges, members 12 and 14 are formed with a finger depression 18.

Between members 12 and 14 about their edges or borders, other than the top edge, is a thin plastic shim 22 which spaces the front and back sheets 12 and 14 sufficiently to form a pocket 20 to receive a checklist card 26. This card can include a pre-flight checklist or the like as indicated by the written material as shown in FIG. 1.

The front and rear members 12 and 14 are formed with a series of coaxial openings 30 and 32 along the lefthand edge thereof.

For each pair of openings 30 and 32, the plastic shim 22 has matching coaxial openings 34 which are substantially smaller in diameter than the openings 30 and 32. The openings receive button members 36. Each button has a length greater than the width 37 of the members 12, 14 and 22. The buttons consist of two cylindrical portions 38 and 40 interconnected by a reduced section 42. The reduced section is formed by two opposing frustroconical surfaces 43 and 44 that meet at a ridge or protuberance 46. The protuberance 46 has a circumference slightly greater than the opening 34.

Figure 2A:
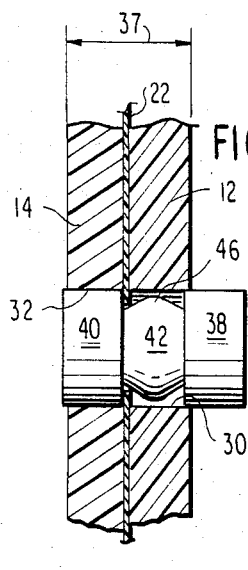
FIGS. 2a, 2b, 2c are cross-sections through the push-buttons showing the sequence of operation.
Figure 2B:
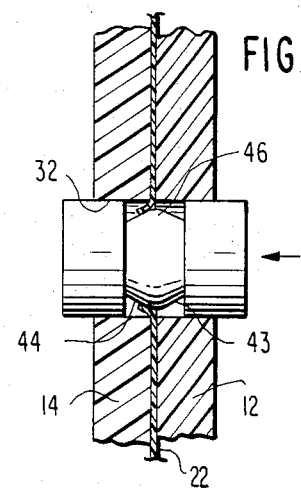
Figure 2C:
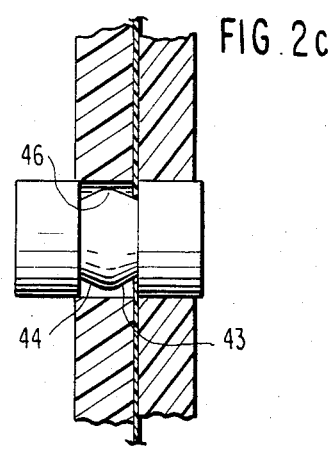

Operation of the buttons can be seen in FIGS. 2a, 2b, and 2c. In FIG. 2a the button is at one rest position. As the operator pushes the button, ridge 46 deforms the shim about opening 34 and gradually expands the opening 34 (see FIG. (2b) until the ridge 46 "snaps" therethrough and the position of FIG. 2c is assumed. The plastic shim 22 is semi-rigid but is sufficiently elastic to deform and provide the opening necessary to push the ridge therethrough. Because the shim will have a tendancy to return to its original shape the tapers 43 and 44 will cooperate with this memory to maintain the buttons in the positions of FIGS. 2a and 2c when not in use.

As each step or task is completed, the button opposite that task is depressed. The button will not return to its original position until it is pushed from the opposite side and the sequence of check-offs can be continued by pushing the buttons in the opposite direction.

Figure 4:
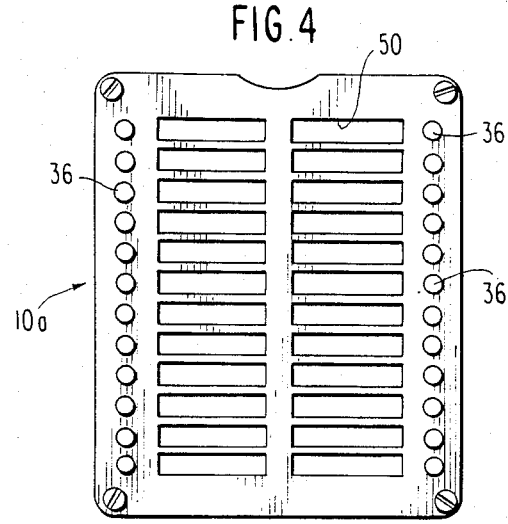
FIG. 4 is a plan view of a further embodiment.

FIG. 4 is an embodiment wherein buttons are disposed on more than one border. In the embodiment of FIG. 1 the members 12 and 14 are transparent. In the embodiment of FIG. 4, the plates are formed with windows 50 rather than being entirely transparent. In each of the embodiments, the cards 20 can have directions on both sides that can be viewed from the exterior of the device.

CAVEAT

While the present invention has been illustrated by a detailed description of a preferred embodiment thereof, it will be obvious to those skilled in the art that various changes in form and detail can be made therein without departing from the true scope of the invention. For that reason the invention must be measured by the claims appended hereto and not by the foregoing preferred embodiment.

I claim:

1. A device for indicating that a series of steps have been performed or not performed comprising a container having a pair of planar members disposed in parallel relationship with each other; a shim means positioned between said members and forming a pocket therebetween, each of said members having a peripheral border about said pocket, said border being formed with a plurality of openings to receive indicator buttons; a card having a series of columnar steps imprinted thereon adapted for reception by said pocket, at least one of said planar members being transparent in the area over said pocket to expose said steps when said card is in said pocket; and a plurality of manually operated indicator buttons disposed along said border adjacent each of said steps, each of said indicator buttons having a length greater than the thickness of said two members whereby said button, when flush with the exterior of one of said members extends beyond the exterior of the other of said members and each of said indicator buttons having a reduced area formed with protuberances intermediate the ends of said button.

2. The device of claim 1 wherein said shim has openings coaxial with said border openings and greater in size than said reduced portion but lesser in size than said protuberances.

3. A push-button assembly comprising a pair of planar members disposed in parallel relationship with each other, said members having overlaying openings of a first cross sectional area to provide a continuous opening through said members; a shim means positioned between said members and forming a space therebetween, said shim having an opening of a second cross sectional area aligned with said openings in said members, said second cross sectional area being smaller than said first cross sectional area; and a button positioned in the space provided by said aligned openings in said members and said shim, said button having a length greater than the combined thicknesses of said members and said shim whereby said button, when flush with the exterior of one of said members, extends beyond the exterior of the other of said members, and said button further having an intermediate section with intermediate end portions and an enlarged central portion, the cross sectional area of said intermediate end portions being less than said first and second cross sectional areas and the cross sectional area of said enlarged central portion being less than said first cross sectional area and greater than said second cross sectional area.

* * * * *